US008055306B2

(12) United States Patent
Li

(10) Patent No.: US 8,055,306 B2
(45) Date of Patent: Nov. 8, 2011

(54) MOBILE PHONE ALERT SYSTEM AND METHOD

(75) Inventor: Chien-Yi Li, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 319 days.

(21) Appl. No.: 12/417,657

(22) Filed: Apr. 3, 2009

(65) Prior Publication Data
US 2010/0022224 A1 Jan. 28, 2010

(30) Foreign Application Priority Data
Jul. 23, 2008 (CN) .......................... 2008 1 0302954

(51) Int. Cl.
*H04B 1/38* (2006.01)
*H04B 7/00* (2006.01)
(52) U.S. Cl. ..... 455/567; 370/259; 370/277; 455/404.1; 455/414
(58) Field of Classification Search .................. 370/259, 370/277, 310, 310.2, 311, 327, 328, 352; 455/404.1, 414.1, 423, 567
See application file for complete search history.

(56) References Cited

U.S. PATENT DOCUMENTS

| 6,236,326 | B1 * | 5/2001 | Murphy | 340/636.1 |
|---|---|---|---|---|
| 6,721,572 | B1 * | 4/2004 | Smith et al. | 455/456.1 |
| 7,072,641 | B2 * | 7/2006 | Satapathy | 455/412.1 |
| 7,099,693 | B2 * | 8/2006 | Shin | 455/557 |
| 7,260,401 | B2 * | 8/2007 | Chen et al. | 455/437 |
| 7,412,263 | B2 * | 8/2008 | Seier | 455/567 |
| 7,610,050 | B2 * | 10/2009 | Sayers et al. | 455/445 |
| 2005/0030928 | A1 * | 2/2005 | Virtanen et al. | 370/338 |
| 2006/0274721 | A1 * | 12/2006 | Flanagan | 370/352 |
| 2009/0325613 | A1 * | 12/2009 | Kuulusa et al. | 455/466 |

FOREIGN PATENT DOCUMENTS
WO  WO 2008141478 A1 * 11/2008
* cited by examiner

*Primary Examiner* — Nick Corsaro
*Assistant Examiner* — Michael S Bush
(74) *Attorney, Agent, or Firm* — Altis Law Group, Inc.

(57) ABSTRACT

A mobile phone alert system sets one or more alert conditions of a mobile phone, and sets a response message corresponding to each of the alert conditions. The system further monitors communication status of the mobile phone when the mobile phone is communicating with a contact mobile phone, determines if an alert condition occurs by determining if the communication status meets the one or more alert conditions, retrieves and sending a corresponding response message to the contact mobile phone number via a first network, in response to a determination that the alert condition occurs to the mobile phone. Additionally, the system may further search a second available network, sends the response message and a request of sending the response message to the contact mobile phone number to a service center via the second network, in response to the response message has not been sent successfully via the first network.

15 Claims, 2 Drawing Sheets

MOBILE PHONE ALERT SYSTEM AND METHOD

BACKGROUND

1. Technical Field

Embodiments of the present disclosure are related to communication management, and particularly to a mobile phone alert system and method.

2. Description of Related Art

Mobile phone failures often occur unexpectedly. For example, the battery may run out before a phone conversation with a person has ended, or a phone conversation may abruptly end due to bad reception. In these instances, the receiver of the phone conversation may not know the reasoning behind why the conversation has ended, causing confusion.

DETAILED DESCRIPTION

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
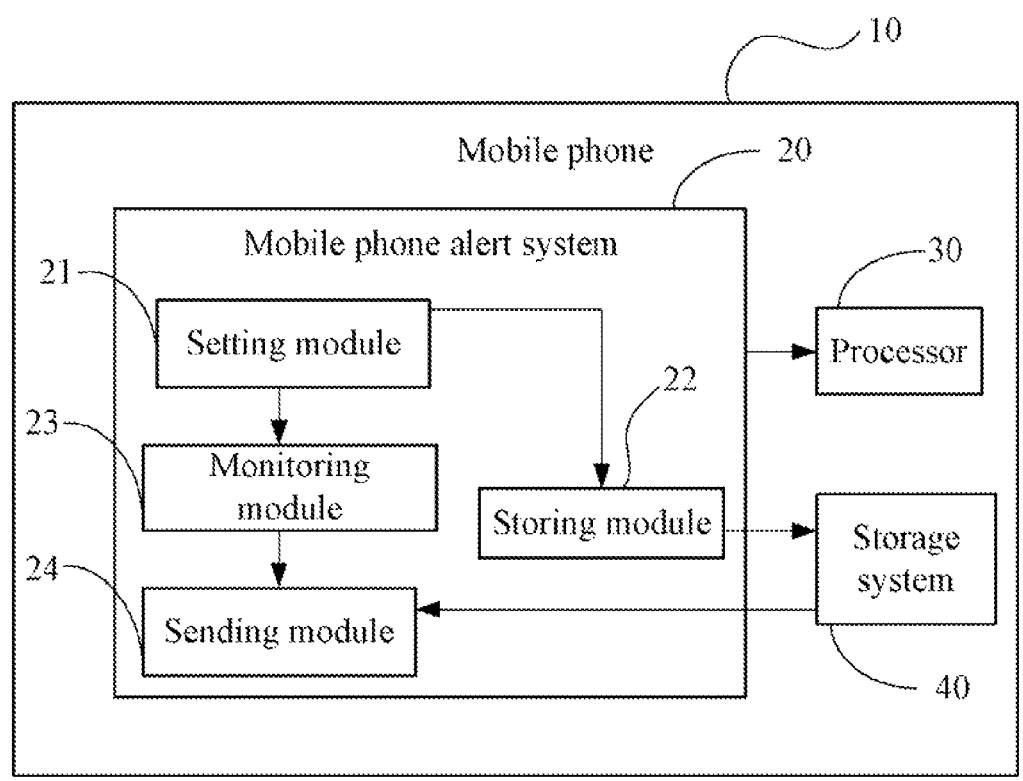
FIG. 1 is a block diagram of one embodiment of a mobile phone alert system.

FIG. 1 is a block diagram of one embodiment of a mobile phone alert system 20 in a mobile phone 10. In one embodiment, the mobile phone 10 may comprise one or more general processors, such as a processor 30, and a storage system 40. The storage system 40 stores one or more programs, such as computerized code of the mobile phone alert system 20, programs of an operating system, and other applications of the mobile phone 10. The processor 30 executes programs of the mobile phone alert system 20 and the other applications, to provide functions of the mobile phone 10.

In one embodiment, the mobile phone 10 can communicate with other communication devices, e.g., other mobile phones, computers, etc., via a mobile phone network that provides a wide range data transfer, such as a global system for mobile communication (GSM) network, a general packet radio service (GPRS) network, a code division multiple access (CDMA) network, a universal mobile telephone service (UMTS) network, and so on. Furthermore, the mobile phone 10 can access the Internet via a wireless local area network (LAN) that provides a short range data transfer, such as a world interoperability for microwave access (WI-MAX) network. The mobile phone 10 may seamlessly roam between the mobile phone network and the wireless LAN.

In one embodiment, the mobile phone alert system 20 comprises a setting module 21, a storing module 22, a monitoring module 23, and a sending module 24. The modules 21, 22, 23, and 24 may be used to execute one or more operations for the mobile phone alert system 20.

The setting module 21 is configured for setting one or more alert conditions of the mobile phone 10, and setting a response message corresponding to each of the alert conditions. For example, a signal strength less than 3 bars may be a weak signal alert condition, and a battery power less than 1 grid may be a low battery power alert condition. Furthermore, the setting module 21 may set a response message of "Sorry! My phone has a weak signal now, I may have to hang up the call" corresponding to the weak signal alert condition, and may set a response message of "Sorry! My phone has low battery power, I'll call you later if our connection disconnects" corresponding to the low battery power alert condition.

The storing module 22 is configured for storing the one or more alert conditions and the response messages corresponding to each of the alert conditions into the storage system 40. In one embodiment, the storage system 40 may be an external storage card, e.g., a smart media card, a secure digital card, a compact flash card, or any other type of memory card.

The monitoring module 23 is configured for monitoring communication status of the mobile phone 10, and determining if any alert condition occurs to the mobile phone 10 by determining if the communication status meets the one or more alert conditions. In one embodiment, the monitoring module 23 monitors the communication status of the mobile phone 10 when the mobile phone 10 is communicating with a contact mobile phone (e.g., sending short massages or making a call), for determining if any alert condition occurs to the mobile phone 10. It may be understood that an alert condition may interrupt communication between one or more users resulting in confusion. The monitoring module 23 can also monitor the communication status of the mobile phone 10 all the time, as long as the mobile phone 10 is powered on.

The sending module 24 is configured for retrieving a response message corresponding to an alert condition from the storage system 40, and sending the response message to the contact mobile phone via the mobile phone network, in response to the alert condition occurs to the mobile phone 10. For example, if the monitoring module 23 detects the weak signal alert condition, the sending module 24 retrieves the response message of "Sorry! My phone has a weak signal now, I may have to hang up the call," and sends the response message to the contact mobile phone via the GSM network. In one embodiment, the response message is a short message.

The monitoring module 23 is further configured for monitoring if the response message has been sent successfully via the mobile phone network, and searching if any wireless LAN is available, in response to a determination that the response message has not been sent successfully via the mobile phone network.

The sending module 24 is configured for sending the response message, the contact mobile phone number, and a request of sending the response message to the contact mobile phone to a service center via the wireless LAN. As mentioned above, the wireless LAN, (e.g., the WI-MAX network) allows the mobile phone 10 to access the Internet as long as the mobile phone 10 is in an area covered by the WI-MAX network. In one embodiment, the service center is a short message service center. As a result, the contact can receive the response message and know why the mobile phone 10 cannot communicate with the contact normally.

Figure 2:
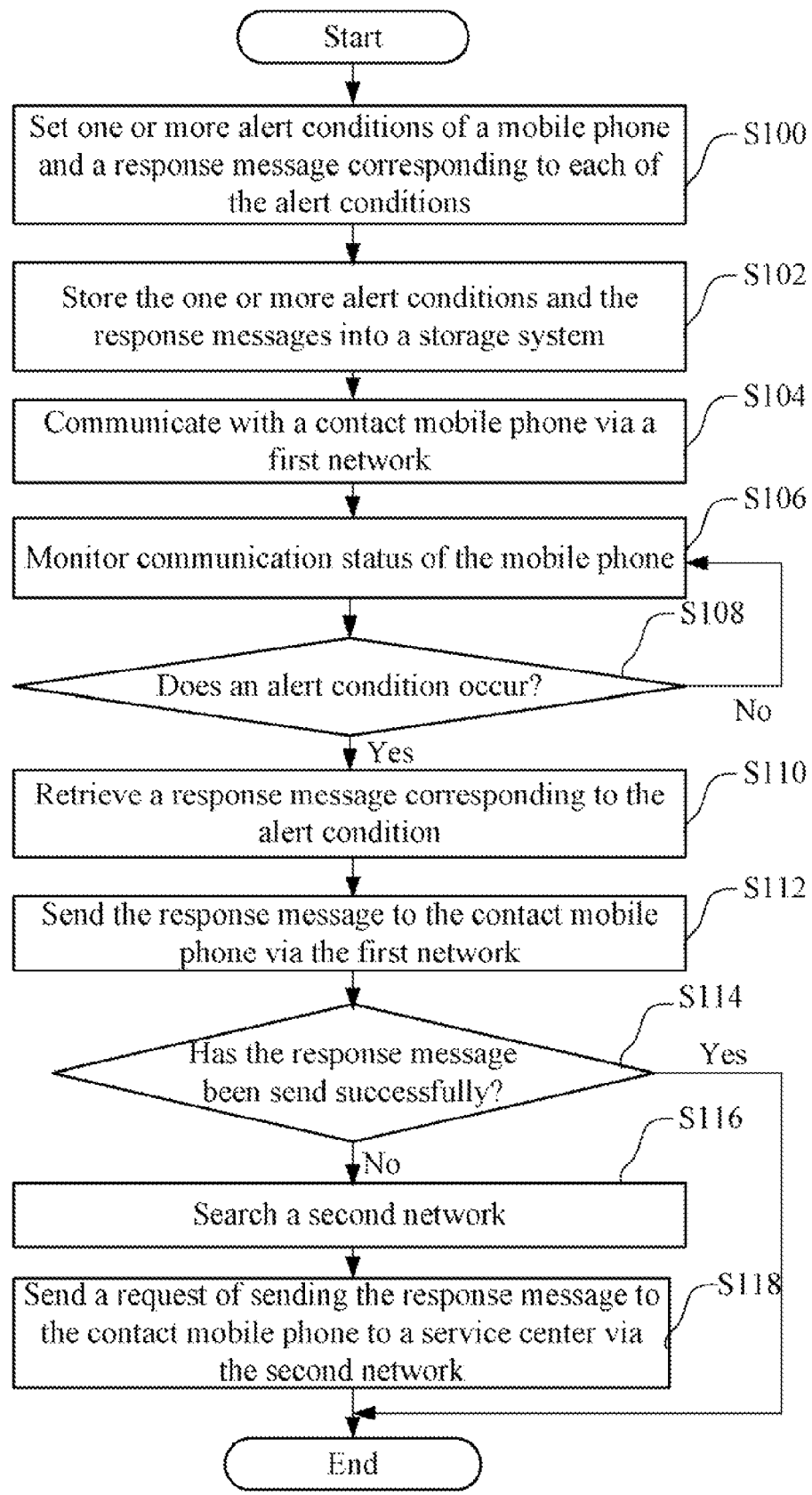
FIG. 2 is a flowchart of one embodiment of a mobile phone alert method.

FIG. 2 is a flowchart of one embodiment of a mobile phone alert method. Depending on the embodiment, additional blocks may be added, others removed, and the ordering of the blocks may be changed.

In block S100, the setting module 21 sets one or more one or more alert conditions of the mobile phone 10, and sets a response message corresponding to each of the alert conditions. Two common alert conditions that may occur to the mobile phone comprise weak signals and low battery power. In one embodiment, the setting module 21 sets a weak signal alert condition as "a signal strength is less than 3 bars," and sets a low battery power alert condition as "a battery power is less than 1 grid." Furthermore, as mentioned above, the setting module 21 may set a response message of "Sorry! My phone has a weak signal now, I may have to hang up the call" corresponding to the weak signal alert condition, and may set an message of "Sorry! My phone has a low battery power, I'll call you later if our connection disconnects" corresponding to the low battery power alert condition.

In block S102, the storing module 22 stores the one or more alert conditions and the response messages corresponding to each of the alert conditions into the storage system 40. In one embodiment, the storage system 40 may be a secure digital card.

In block S104, a user uses the mobile phone 10 to communicate with a contact, e.g., make a call via a mobile phone network, such as the GPRS network.

In block S106, the monitoring module 23 monitors communication status of the mobile phone 10 all through the communication process between the mobile phone 1 and the contact mobile phone.

In block S108, the monitoring module 23 determines if the communication status meets the one or more alert conditions, to detect if an alert condition occurs to the mobile phone 10. For example, the monitoring module 23 detects if the signal strength of the mobile phone 10 is less than 3 bars, or if the battery power of the mobile phone 10 is less than 1 grid. If an alert condition, e.g., a low battery power alert condition occurs to the mobile phone 10, the communication may be interrupted at any moment, in such case, the procedure goes to block S10. Otherwise, if no alert condition occurs, the procedure goes back to block S106.

In block S110, the sending module 24 retrieves a response message corresponding to the alert condition from the storage system 40. As mentioned above, the sending module 24 retrieves the message of "Sorry! My phone has a low battery power, I'll call you later if our connection disconnects."

In block S112, the sending module 24 sends the retrieved response message to the contact mobile phone via the mobile phone network.

In block S114, the monitoring module 23 detects if the retrieved response message has been sent successfully via the mobile phone network. If the retrieved response message has been sent successfully via the mobile phone network, the procedure ends. Otherwise, if the retrieved response message has been sent successfully via the mobile phone network, the procedure goes to block S116.

In block S116, the monitoring module 23 searches other available networks, e.g., the wireless LAN that allows the mobile phone 10 access the Internet on condition that the mobile phone 10 positions in the area covered by the wireless LAN.

In block S118, the sending module 24 sends the retrieved response message, the contact mobile phone number, and a request of sending the retrieved response message to the contact mobile phone to a short message service (SMS) center. After receiving the request, the SMS center may transmit the retrieved message to the contact mobile phone, then the contact may know that the communication may be interrupted or may understand why the user of the mobile phone 10 suddenly hangs up the call.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A mobile phone alert method, the method comprising:
setting one or more alert conditions of a mobile phone, and setting a response message corresponding to each of the alert conditions;
storing the one or more alert conditions and the response message of each alert condition into a storage system;
establishing a connection between the mobile phone and a contact mobile phone via a first network;
monitoring communication status of the mobile phone while the mobile phone is connected with the contact mobile phone over the first network;
determining if an alert condition occurs to the mobile phone by determining if the communication status of the mobile phone meets the one or more alert conditions;
retrieving a response message corresponding to the alert condition from the storage system and sending the response message to the contact mobile phone from the mobile phone via the first network, to inform a user of the contact mobile phone of a reason why the communication is dropped via the first network, in response to a determination that an alert condition occurs to the mobile phone, the response message sent while the mobile phone is connected to the contact mobile phone;
searching a second available network, in response to a determination that the response message has not been sent successfully via the first network; and
sending a request of sending the response message to the contact mobile phone to a service center via the second available network, to inform a user of the contact mobile phone of a reason why the communication is dropped via the second network.

2. The method as claimed in claim 1, wherein the alert condition is a low battery power condition or a weak signal strength condition.

3. The method as claimed in claim 1, wherein the storage system is selected from the group consisting of a smart media card, a secure digital card, and a compact flash card.

4. The method as claimed in claim 1, wherein the first network is selected from the group consisting of a global system for mobile communication (GSM) network, a general packet radio service (GPRS) network, a code division multiple access (CDMA) network, and a universal mobile telephone service(UMTS) network.

5. The method as claimed in claim 1, wherein the second available network is a wireless local area network.

6. A mobile phone alert system, the system comprising:
a storage system;
at least one processor; and
one or more programs stored in the storage system and being executable by the at least one processor, the one or more programs comprising:
a setting module configured for setting one or more alert conditions of a mobile phone, and setting a response message corresponding to each of the alert conditions;
a storing module configured for storing the one or more alert conditions and the response message of each alert condition into the storage system;
a monitoring module configured for monitoring communication status of the mobile phone when a connection between the mobile phone and a contact mobile phone has been established via a first network and while the mobile phone is connected with the contact mobile phone over the first network, and determining if an alert condition occurs to the mobile phone by determining if the communication status of the mobile phone meets the one or more alert conditions;

a sending module configured for retrieving a response message corresponding to the alert condition from the storage system and sending the response message to the contact mobile phone from the mobile phone via the first network, to inform a user of the contact mobile phone of a reason why the communication is dropped via the first network, in response to a determination that an alert condition occurs to the mobile phone, the response message sent while the mobile phone is connected to the contact mobile phone;

the monitoring module further configured for searching a second available network, in response to a determination that the response message has not been sent successfully via the first network; and the sending module further configured for sending a request of sending the response message to the contact mobile phone to a service center via the second available network, to inform a user of the contact mobile phone of a reason why the communication is dropped via the second available network.

7. The system as claimed in claim 6, wherein the alert condition is a low battery power condition or a weak signal strength condition.

8. The system as claimed in claim 6, wherein the storage system is selected from the group consisting of a smart media card, a secure digital card, and a compact flash card.

9. The system as claimed in claim 6, wherein the first network is selected from the group consisting of a global system for mobile communication (GSM) network, a general packet radio service (GPRS) network, a code division multiple access (CDMA) network, and a universal mobile telephone service(UMTS) network.

10. The system as claimed in claim 6, wherein the second available network is a wireless local area network.

11. A non-transitory storage medium storing a set of instructions, the set of instructions capable of being executed by a processor to perform a mobile phone alert method, the method comprising:

setting one or more alert conditions of a mobile phone, and setting a response message corresponding to each of the alert conditions;

storing the one or more alert conditions and the response message of each alert condition in a storage system;

establishing a connection between the mobile phone and a contact mobile phone via a first network;

monitoring communication status of the mobile phone while the mobile phone is connected with the contact mobile phone over the first network;

determining if an alert condition occurs to the mobile phone by determining if the communication status of the mobile phone meets the one or more alert conditions;

retrieving a response message corresponding to the alert condition from the storage system, and sending the response message to the contact mobile phone from the mobile phone via the first network, to inform a user of the contact mobile phone of a reason why the communication is dropped via the first network, in response to a determination that an alert condition occurs to the mobile phone, the response message sent while the mobile phone is connected to the contact mobile phone;

searching a second available network, in response to a determination that the response message has not been sent successfully via the first network; and sending a request of sending the response message to the contact mobile phone to a service center via the second available network, to inform a user of the contact mobile phone of a reason why the communication is dropped via the second available network.

12. The non-transitory storage medium as claimed in claim 11, wherein the alert condition is a low battery power condition or a weak signal strength condition.

13. The non-transitory storage medium as claimed in claim 11, wherein the storage medium is selected from the group consisting of a smart media card, a secure digital card, and a compact flash card.

14. The non-transitory storage medium as claimed in claim 11, wherein the first network is selected from the group consisting of a global system for mobile communication (GSM) network, a general packet radio service (GPRS) network, a code division multiple access (CDMA) network, and a universal mobile telephone service(UMTS) network.

15. The non-transitory storage medium as claimed in claim 11, wherein the second available network is a wireless local area network.

* * * * *